United States Patent [19]

Chi

[11] Patent Number: 5,191,177
[45] Date of Patent: Mar. 2, 1993

[54] TUBE SPEAKER

[76] Inventor: Yang H. Chi, 14162 S. Orange Ave., Paramount, Calif. 90723

[21] Appl. No.: 721,948

[22] Filed: Jun. 27, 1991

[51] Int. Cl.⁵ .............................................. H05K 5/00
[52] U.S. Cl. .................................... 181/153; 181/156; 181/199
[58] Field of Search ............... 181/141, 150, 152, 153, 181/155, 156, 199, 196; 381/86

[56] References Cited

U.S. PATENT DOCUMENTS

| | | | |
|---|---|---|---|
| 2,896,737 | 7/1959 | Gellman | 181/153 |
| 3,385,393 | 5/1968 | Gold | 181/153 |
| 3,393,766 | 7/1968 | Mitchell | 181/156 |
| 3,590,145 | 7/1971 | McKenzie | 181/145 |
| 4,223,760 | 9/1980 | Le Tourneau | 181/153 X |
| 4,298,087 | 11/1981 | Launau | 181/153 |
| 4,501,934 | 2/1985 | Wiener | 181/156 |
| 4,567,959 | 2/1986 | Prophit | 181/156 |
| 4,580,654 | 8/1986 | Hale | 181/199 X |
| 4,756,382 | 7/1988 | Hudson, III | 181/156 |
| 4,819,761 | 4/1989 | Dick | 181/156 |
| 4,924,965 | 5/1990 | Murayama et al. | 181/156 |
| 4,928,787 | 5/1990 | Kato | 181/141 |

*Primary Examiner*—Michael L. Gellner
*Assistant Examiner*—Khanh Dang

*Attorney, Agent, or Firm*—Charles H. Thomas

[57] ABSTRACT

A tube speaker system having a pair of cylinder bass speakers aligned end to end with closed or blind ends in mutual juxtaposition and with speakers mounted in the other open ends which are opposite each other. A support is secured beneath the coaxially aligned speaker cylinders to prevent the cylinders from rolling on their cylindrical walls. Also, the system is provided with means for forming a laterally enclosed sound tunnel that extends the lengths of the speakers in communication with radial openings in the cylindrical walls thereof. The support may take the form of channel-shaped stand atop the sides of which the tubular speakers are mounted. Alternatively, the sound tunnel may be formed by a larger diameter cylinder within which the cylindrical tube speakers are located. In this embodiment the stand may be formed by a flat slab atop which both the larger diameter cylinder and the cylindrical tube speakers are mounted. The tube speakers are thereby stabilized so that they will not roll on their sides when carried in an automotive vehicle. Also, the various embodiments of the speaker system of the invention have hollow sound tunnels which carry the sound alongside the tubular wall of the speaker housing and within a surrounding structure.

12 Claims, 4 Drawing Sheets

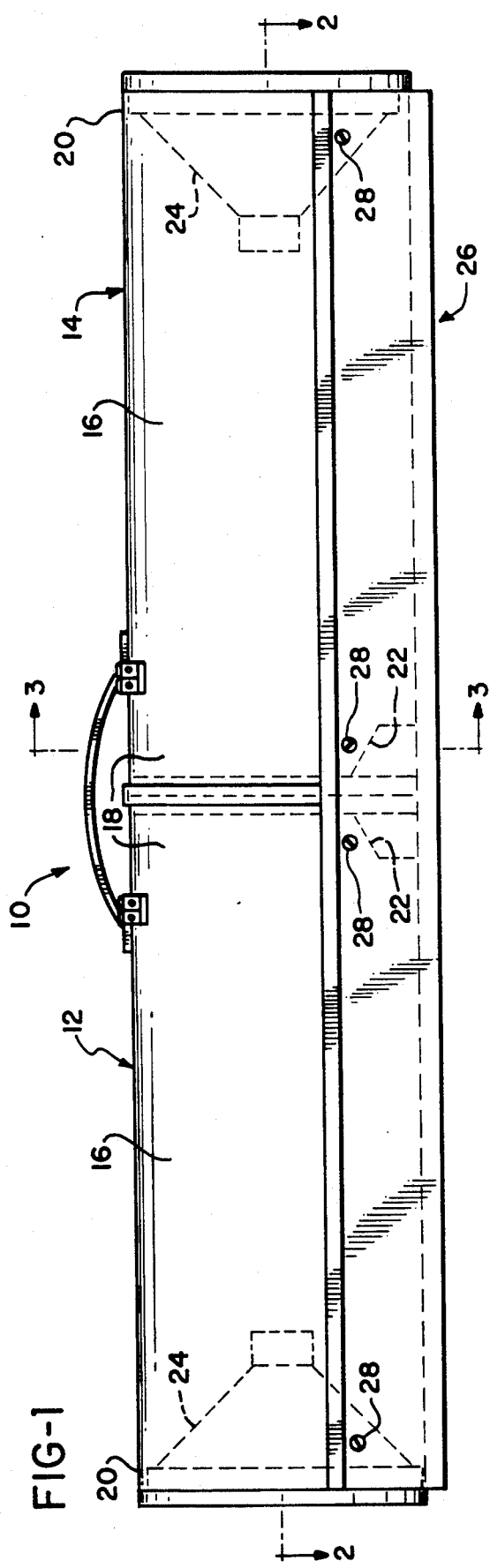
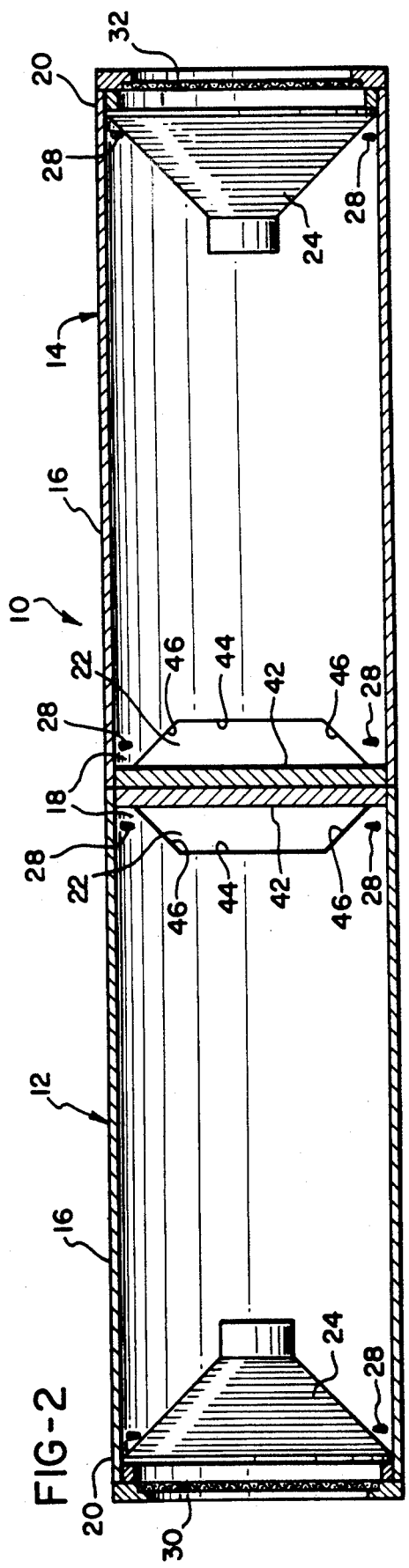

TUBE SPEAKER

BACKGROUND OF THE INVENTION

1. Field of the Invention

The present invention relates to an improved configuration for audio tube speakers, especially those utilized in automotive vehicles.

2. Description of the Prior Art

Audio bass speakers are often constructed with a tubular cylindrical housing that is closed at one end and which has an audio speaker unit mounted at the opposite end. Such bass speakers are often referred to as "woofers" and are of a relatively large size. Commercially available tubular bass speakers designed for use in automotive vehicles typically have an outer tube diameter of six inches, eight inches, ten inches or twelve inches. The speaker tubes may be of any selected length, and are available in a wide variety of lengths. One popular length is about twenty inches. The relatively large size of such tube speakers or "woofers" provides clear and resonant audio propagation for achieving high quality reproduction of low frequency sound.

In recent years high quality sound reproduction systems have gained increased popularity for use in vehicles, such as hatchback and sedan automobiles, vans, station wagons and pick up trucks. The high quality of low frequency sound reproduction achieved with tube speakers has contributed significantly to the popularity of tube speakers among automotive vehicle owners, particularly among younger owners.

When tube speakers are employed in automotive vehicles, they are often merely laid on the floor of a van or on a flat panel in the rear of an automotive vehicle, such as the panel behind the back seat and beneath the rear window of an automobile. Due to their cylindrical shape, tube speakers lying on their sides on flat surfaces in an automotive vehicle will tend to roll about unless restrained. The speakers will roll due to inertia as the vehicle makes turns around corners or brakes to a stop.

The rolling movement of conventional tube speaker systems can damage the sound reproduction units, and in any event is annoying to the occupants of a vehicle. According to conventional practice tube speakers are restrained from rolling by means of straps that are secured about the speaker and fastened to the surfaces upon which the speakers are placed, or by wedging the speakers behind or beneath seats in the vehicle.

One alternative approach to stabilization of a tube speaker in a vehicle is disclosed in U.S. Pat. No. 4,756,382. According to this arrangement, an otherwise cylindrical tube speaker is provided with a laterally directed audio duct that projects outwardly in a plane generally perpendicular to the axis of the tube speaker. The system thus is of a generally T-shaped configuration and is designed to reduce the tendency of the speaker to roll during changes in the velocity of a vehicle without the necessity for external mounting straps or other stabilizing devices. However, by providing the speaker with a duct aligned generally normal to the axis of the speaker, the resonant propagation of sound from the tube speaker that otherwise acts longitudinally along the length of the speaker enclosure is disrupted. Furthermore, the T-shaped configuration of the speaker enclosure increases the width of the space occupied by the speaker on a deck or floor of a vehicle.

SUMMARY OF THE INVENTION

The present invention involves a new and novel system for mounting cylindrical tube speakers on their sides upon flat surfaces. This improved tube speaker mounting system is particularly suitable for use in mounting tube speakers in automotive vehicles.

According to the present invention a pair of tube speakers are mounted coaxially end to end with the diaphragms of their speaker units directed in opposite longitudinal directions and with their solid, disk-shaped end closures at their opposite ends residing in mutual juxtaposition. According to the invention, the coaxially aligned, horizontally disposed tubular cylinders of the speakers are provided with a supporting means located directly beneath the speaker cylinders to prevent the cylinders from rolling on their cylindrical surfaces. Furthermore, the speaker system configuration also involves a laterally enclosing sound tunnel that extends the lengths of the tubular cylinders. Radial openings are defined in the speaker cylinders proximate to the closed, juxtaposed ends of the coaxially aligned cylinders and remote from the speakers mounted in the opposite ends of the tubular cylinders.

Sound from the speakers in the tube speaker system of the invention travels not only directly outwardly from the exposed ends of the tube cylinders, but also reverberates within the tube cylinders and travels radially outwardly therefrom near the closed ends thereof and longitudinally through the audio tunnel formed by the lateral enclosure alongside the walls of the speaker tubes. By providing the speaker with an audio tunnel formed generally parallel to and alongside the alignment of the speaker element, an augmented bass audio effect is achieved.

One principal object of the invention is to provide a tube speaker with an improved configuration which prevents the speaker from rolling on its side and which avoids the use of external straps to restrain movement of the speaker. Physical stabilization of the tube speaker is achieved without requiring holes to be drilled in the rear window deck or in the bed of the vehicle. Thus, no alteration of the vehicle is required whatsoever to stabilize the tube speakers from movement within the vehicle.

Another object of the invention is to achieve physical stabilization of tube speakers employing a structure that concurrently improves the bass effect of the audio output of the speakers. This enhanced sound output may be achieved utilizing the same structure which provides the tube speaker with physical stability.

According to the present invention a pair of tube speakers are mounted coaxially end to end with their diaphragms directed in opposite directions and with their solid, disk-shaped end closures residing in mutual juxtaposition. In one embodiment of the invention the speakers are carried in a cradle formed with a flat horizontal floor and with upright side walls that extend up to the sides of the speakers to intersect the structure of the speaker tubes at the maximum width thereof as measured in a horizontal plane. At the blind end of each speaker a slot is cut in the arcuate wall. The slot defines a gap of about one and one-quarter inches in width from the flat circular face of the end closure of the blind end of the tube in which the speaker is mounted.

The slot preferably extends over the entire arc of the portion of the tubular wall which is encompassed within the confines between the upright wooden side walls atop which the speaker tubes are mounted. This slot or sound port thereby provides open communication from within the tubular structure of the tube speaker housing to the hollow space beneath the tubular structure. This cavity is defined by the outer surface of the structure of the speaker tubes, the upper inner surface of the floor, and the upright inner surfaces of the sides of the speaker cradle. This hollow space is open at both ends of the overall structure. Sound therefore emanates not only directly out of the ends of the tube speaker cylinders in which the speakers are mounted, but also rearwardly within the speaker tubes, through the open slots and then back forwardly in the hollow space beneath the tubular speakers.

The foregoing structure enhances the sound quality which emanates from the speaker, but also performs another very important function. By providing the tubular speaker with a flat base, the speaker does not need to be strapped down but will remain stable despite sudden starts, stops and turns of the vehicle. This stability is achieved with the cradle formed by the floor or base and the walls of the upright sides.

The dimensions of the floor of the support may be such that the sides of the tubular speaker cylinders rest in contact with the upwardly facing surface of the supporting floor of the cradle. The outer surfaces of the sides of the cradle are substantially tangent to the outer surfaces of the tube speaker cylinders. Alternatively, the sides of the cradle may be high enough so that the sides of the cylindrical tube speakers rest only atop the upright sides of the supports. With this modification the floor and the sides of the cradle form a cavity of greater volume beneath the tubular structures of the cylindrical speaker housings. If desired, mid-range speakers and upper range speakers or "tweeters" can be mounted within this cavity in openings in one or both of the sides of the cradle structure beneath the cylindrical tube speaker housings.

The entire unit may be provided with a single carrying handle that spans the juxtaposed ends of the longitudinally aligned speaker cylinders. Alternatively, each speaker cylinder can be provided with a separate carrying handle. The speaker cylinders are typically constructed of cardboard while the cradle may have wooden sides and a pressboard floor.

In an alternative embodiment of the invention the tubular speaker cylinders are again aligned end to end with their blind ends in mutual abutment. In this embodiment the tubular speaker cylinders are housed within a larger diameter tube, which may be constructed of cardboard. The tubular speaker cylinders lie against the inner wall of the larger diameter tube along a longitudinal line of contact in an internally tangential arrangement relative to the larger, outer cylindrical tube. On the opposite side of the larger tube a flat stand in the form of a rectangular slab can be secured by screws that extend through both the larger diameter outer tube, and the inner tube cylinders of the speakers.

In this way the tube speaker system is provided both with a stand that prevents the speaker tubes from rolling on their sides, and also with an audio tunnel formed in the space between the outer surfaces of the tubular speaker cylinders and the inner surface of the surrounding, larger diameter enclosure. This tunnel is of a generally crescent-shaped cross section and conducts sound to improve the audio bass effect achieved in much the same manner as the tunnel defined between the structure of the cradle and the outer cylindrical walls of the speaker tubes of the embodiment previously described. In both embodiments sound will emanate not only from the ends of the speaker housing in which the speaker apparatus is mounted, but also through the hollow space between the speaker tubes and the lateral enclosure that is longitudinally aligned therewith.

The primary features characteristic of all of the embodiments of the invention are:
1. Improved stability of the tube speakers by the provision of a pair of tube speakers with a flat stand upon which they are secured so that they won't roll; and
2. A hollow cavity which serves as an audio tunnel to carry the sound from the back side of the speaker elements alongside the tubular walls of the speaker cylinders and within a laterally surrounding structure.

In one broad aspect the present invention is a tube speaker system comprising a pair of tubular cylinders, each having opposite first and second ends and a cylindrical wall with a radial opening therethrough proximate the first end thereof. The tubular cylinders are disposed horizontally in coaxial alignment with the first ends of the cylinders in mutual abutment. A separate speaker is mounted in each of the second ends of the cylinders. According to the improvement of the invention, a supporting means is secured beneath the coaxially aligned cylinders to prevent the cylinders from rolling on their cylindrical walls. Also, a laterally enclosed sound tunnel means is provided to extend along the lengths of the tubular cylinders in communication with the radial openings in the cylindrical walls thereof.

The invention may be described with greater clarity and particularity by reference to the accompanying drawings.

DESCRIPTION OF THE DRAWINGS

FIG. 1 is a side elevational view of one preferred embodiment of a tube speaker system according to the invention.

FIG. 2 is a sectional plan view taken along the lines 2—2 of FIG. 1.

DESCRIPTION OF THE EMBODIMENTS

Figure 3:
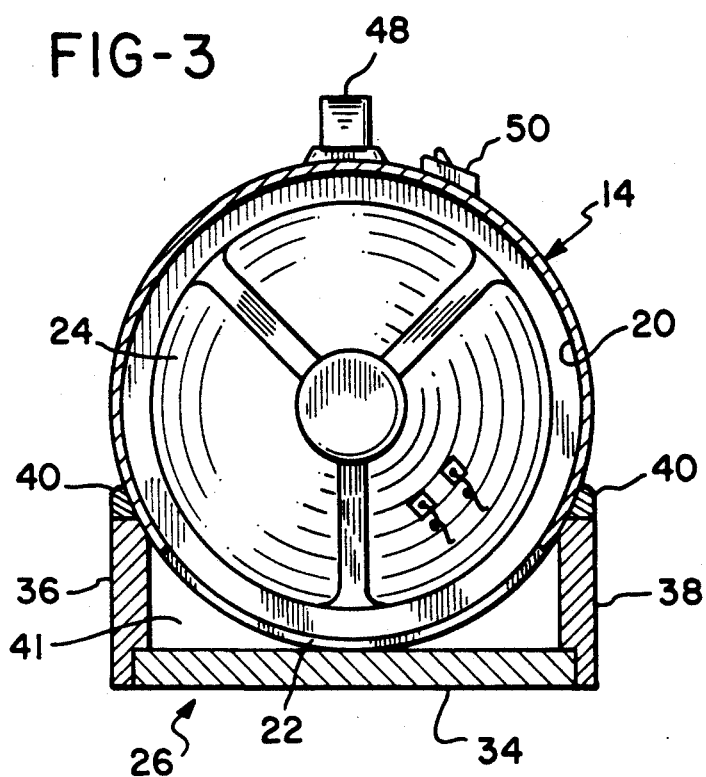
FIG. 3 is a sectional elevational view taken along the lines 3—3 of FIG. 1.

FIGS. 1-4 illustrate a tube speaker system indicated generally at 10 comprising a pair of horizontally disposed cylindrical bass audio speaker tubes 12 and 14, known in the trade as "woofers". Each of the speaker tubes 12 and 14 has a cylindrical wall 16 which terminates at a first end 18 and an opposite second end 20. As illustrated in FIG. 2, a radial opening 22 is defined in each of the walls 16 proximate the first end 18 thereof. The speaker tubes 12 and 14 are disposed in end to end relationship with the first ends 18 thereof in mutual juxtaposition. Separate audio speakers 24 are mounted in each of the second ends 20 of the speaker tubes 12 and 14.

The cylindrical walls 16 of the speaker tubes 12 and 14 are constructed of cardboard three-eighths of an inch in thickness. The speaker tubes 12 and 14 are typically six, eight, ten or twelve inches in diameter, although they may be constructed in other sizes as well. Each of the speaker tubes 12 and 14 may, for example, be twenty inches in length.

As illustrated in FIG. 2, the radial openings 22 extend over an arcuate portion of the cylindrical walls 16 at each of the first ends 18 thereof. The first ends 18 of each of the cylindrical walls 16 of the speaker tubes 12 and 14 are constructed as blind ends, transversely closed by wooden, disk-shaped end plugs 42 which are glued within the first ends 18 of the cylindrical walls 16.

The openings 22 are formed by cut outs in the cylindrical walls 16 each having the shape of a trapezoid wrapped on a cylindrical surface. The edge 44 of each opening 22 is spaced approximately one and one-quarter inches from the inwardly facing surface of the plug 42 at the first end 18 in which the opening 22 is formed. The edges 46 are cut at approximately a forty five degree angle relative to the edge 44.

A stand in the form of a cradle 26 is secured to and supports the speaker tubes 12 and 14. The cradle 26 is fastened to the speaker tubes 12 and 14 by means of wood screws 28. The cradle 26 also serves as a lateral enclosure which is disposed about at least a portion of the walls 16 in which the radial openings 22 are defined. The lateral enclosure forms an audio tunnel 41 and extends the lengths of the tubes 12 and 14 and has opposite end openings 30 and 32 from which sound emanates at the second ends 20 of the cylindrical walls 16 of the speaker tubes 12 and 14.

Figure 4:
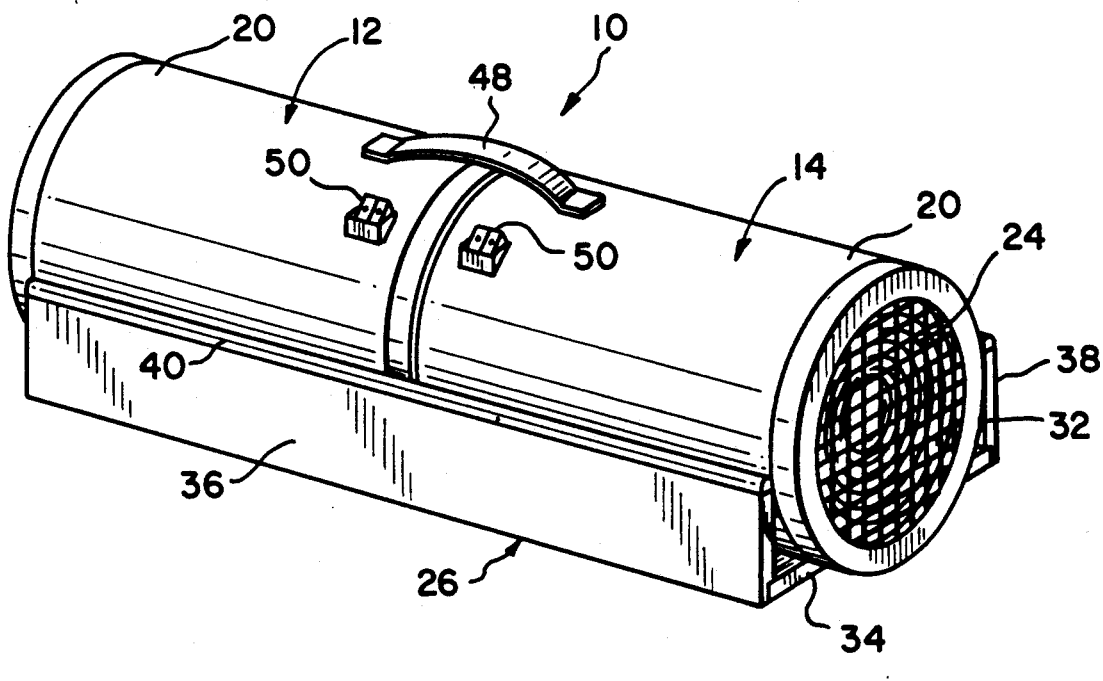
FIG. 4 is a perspective view of the same embodiment of the speaker system of the invention.

As best illustrated in FIG. 3, the cradle 26 is formed by a channel having a flat horizontal floor 34 and upright sides 36 and 38. The floor 34 may be formed of wooden pressboard one-half of an inch in thickness. The sides 36 and 38 may be formed of wood one-half of inch in thickness. The upright sides 36 and 38 extend longitudinally alongside the cylindrical walls 16 of the speaker tubes 12 and 14 on opposite sides thereof, as illustrated in FIGS. 3 and 4. The sides 36 and 38 of the cradle 26 are attached to the cylindrical walls 16 of the speaker tubes 12 and 14 by means of the screws 28. Linear, decorative plastic strips 40 extend longitudinally along the upper edges of the sides 36 and 38 at their interfaces with the outer surfaces of the cylindrical walls 16. The lower edges of the sides 36 and 38 are rabbeted to receive the pressboard floor 34, which is glued thereto.

The tube speaker system 10 may be carried by means of a nylon strap handle 48. Sets of speaker wire terminal connectors 50 are provided to receive electrical connections to power each of the speakers 24 separately.

Wires within the speaker tubes 12 and 14 are soldered to the terminal connectors 50 and are coupled to the speakers 24. The tube speaker system 10 may be placed on the flat, horizontal panel behind the back seat and in front of the rear window of a typical conventional sedan-type or hatchback-type automobile or on the floor of a van. In either event the channel or cradle-shaped support 26 provides a stable base atop which the tubular speaker cylinders 12 and 14 rest. Since the flat floor 34 of the support 26 rests atop a horizontal surface, the cylindrical speaker tubes 12 and 14 will not roll about, even when the vehicle makes sharp turns or sudden changes in velocity.

In the operation of the tube speaker system 10 high quality, low frequency sound emanates directly from both of the speakers 24 at the oppositely directed second ends 20 of the speaker tubes 12 and 14. In addition, however, the low frequency sound also travels internally within the confines of the cylindrical walls 16 from the obverse sides of the speakers 24 toward the first ends 18 of the speaker tubes 12 and 14. The interior speaker cavities within the cylindrical walls 16 are in open communication with the audio tunnel defined between the interior surfaces of the cradle walls 36 and 38, the cradle floor 34, and the exterior surfaces of the cylindrical walls 16, through the radial openings 22. Sound readily passes from within the confines of the tube speakers 12 and 14 radially through the openings 22 in the cylinder walls 16 and longitudinally through the audio tunnel 41 and out the open ends 30 and 32 of the support 26. The emanation of sound both directly from the speakers 24 and indirectly through the audio tunnel 41 enhances the bass audio effect of the tube speaker system 10.

Figure 5:
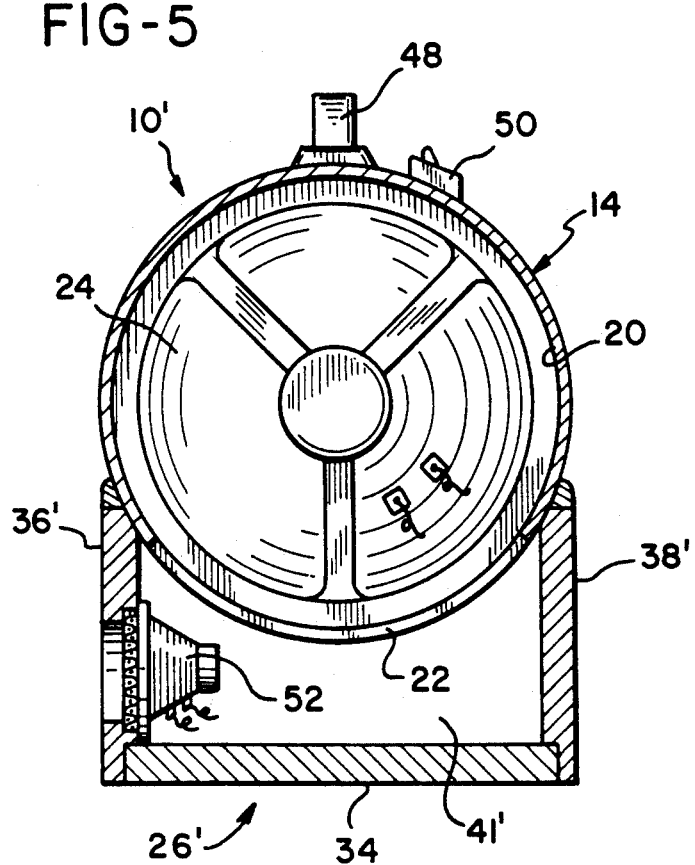
FIG. 5 is a sectional elevational view analogous to that of FIG. 3 showing a modified form of the embodiment of FIGS. 1-4.

FIG. 5 illustrates a modified version of the tube speaker system of FIGS. 1-4 and is indicated generally at 10'. The tube speaker system 10' is similar in many respects to the speaker system 10 but differs in that the sides 36' and 38' of the support 26' are taller than the sides 36 and 38 of the support 26. As a consequence, the cavity or audio tunnel 41' located beneath the speaker tubes 12 and 14 is larger and can easily accommodate additional smaller speakers 52 having a higher audio range than the tube speakers or "woofers" 12 and 14. As illustrated in FIG. 5, the side 36' is provided with openings which accommodate mid-range or "tweeter" speakers 52 which are mounted within the audio tunnel 41'. The "tweeters" 52, like the "woofers" 12 and 14 have conventional electrical connections which appear externally on the unit at plugs, such as the plugs 50 depicted in FIGS. 1 and 4.

Figure 6:
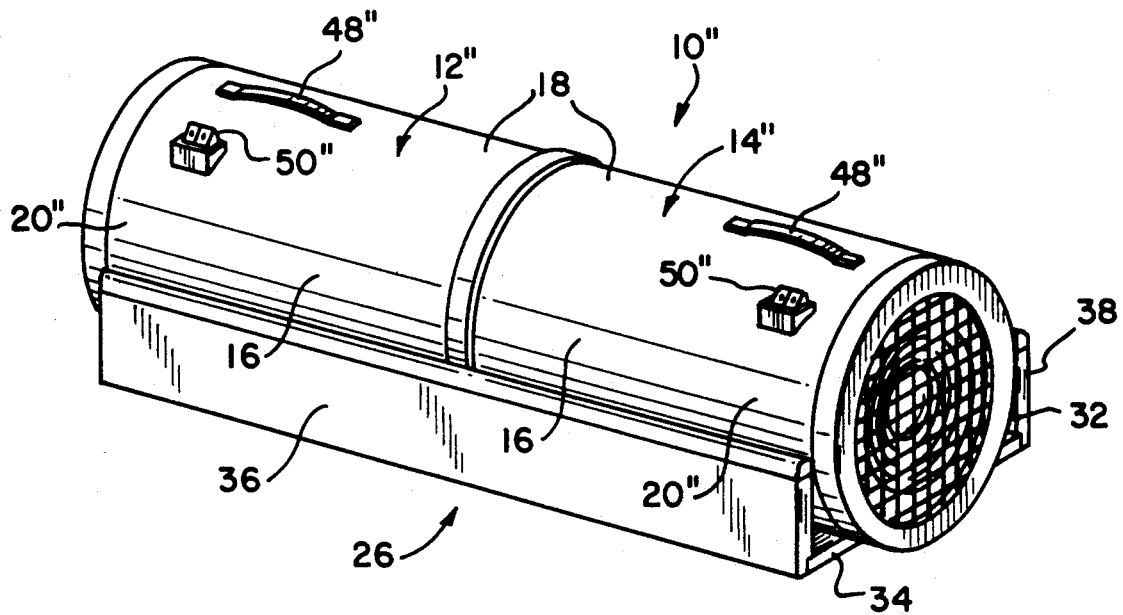
FIG. 6 is a perspective view of a further modified version of the tube speaker system of FIGS. 1-4.

FIG. 6 illustrates at 10'' still another variation of the tube speaker system according to the invention. The tube speaker system 10'' employs a pair of tubular cylindrical woofers 12'' and 14'' which are not permanently connected together, but which are separable from each other. The tube speakers 12'' and 14'' each have a separate carrying handle 48'' by means of which they can be carried separately, if separated from the support 26. Also, the electrical terminal plugs 50'' for the speaker system 10'' are connected to the tubular cylinders 12'' and 14'' near the second ends 20'' of the tube speakers 12'' and 14'', rather than at the first ends 18''.

In all of the modifications of the tube speaker system of the invention which are depicted in FIGS. 1-6 the speaker tubes each have first and second ends with cylindrical walls and are mounted coaxially end to end in a horizontal disposition with their first ends closed by partitions and in mutual juxtaposition. The second ends of the speaker tubes are mutually opposite to each other and have low frequency speakers 24 mounted therein. The supporting stand or cradle is secured beneath the cylindrical tube speakers and defines a stable, underlying support for them. Radial openings are defined in each of the cylindrical walls of the speaker tubes proximate each of the first ends thereof. An audio tunnel means is formed between the outer cylindrical surfaces of the speaker tubes and the inner, channel-shaped surfaces of the underlying support. The audio tunnel is open at both ends and has laterally enclosing walls that extend alongside the speaker tubes throughout their lengths.

The radial openings 22 in the cylindrical walls 16 of the speaker tubes are in open communication with the audio tunnel. Thus, sound emanates not only directly longitudinally from the speakers 24 along the axis of the speaker tubes, but also radially outwardly from proximate the juxtaposed ends of the speaker tubes and longitudinally through the open ends of the tunnel formed by the speaker support 26 or 26'. The interior surfaces of the sides and base slab or floor 34 of the support 26 or 26' and the exterior surfaces of the cylindrical speaker tubes 12 and 14 serve as walls for the audio tunnel 41 or 41' formed between the speaker tubes 12 and 14 and the support 26. The cradles 26 and 26' each serve as both a supporting means and as a sound tunnel means. They each form a lateral enclosure disposed about at least a portion of the walls 16 in which the radial openings 22 are defined. The lateral enclosure formed by the cradles 26 and 26' extends the length of the speaker tubes and has opposite end openings 30 and 32 proximate at least the second ends 20 of the cylindrical walls 16 of the speaker tubes.

Figure 7:
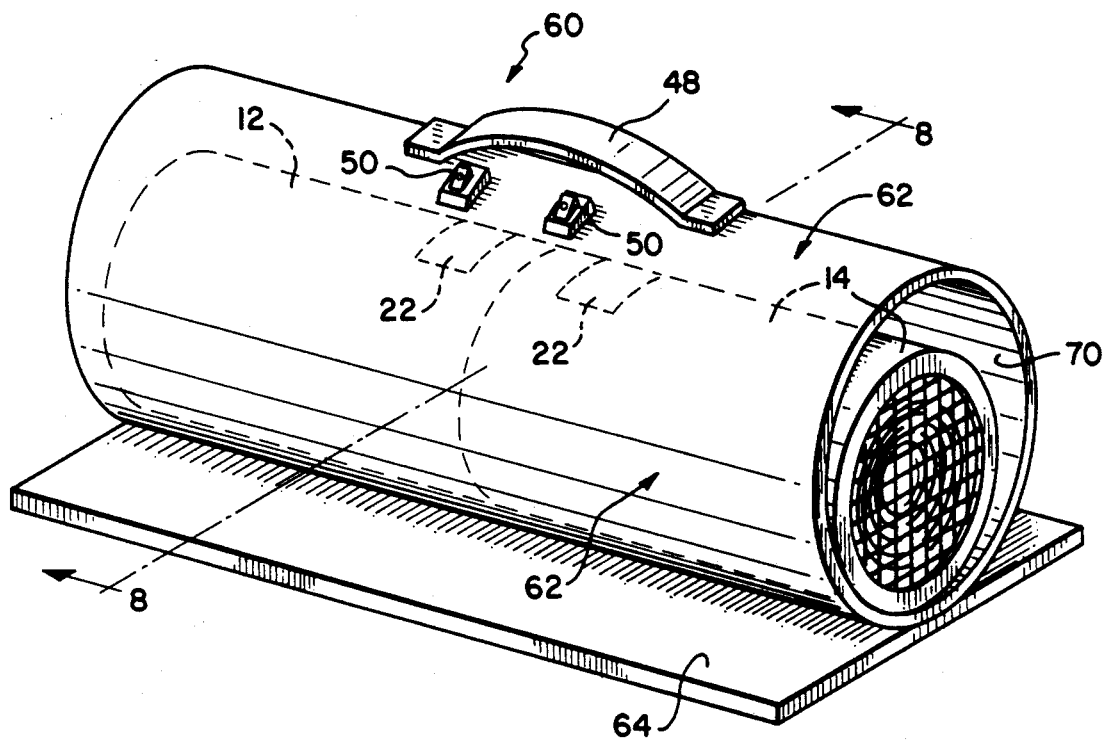
FIG. 7 is a perspective view of an alternative embodiment of the tube speaker system of the invention.
Figure 8:
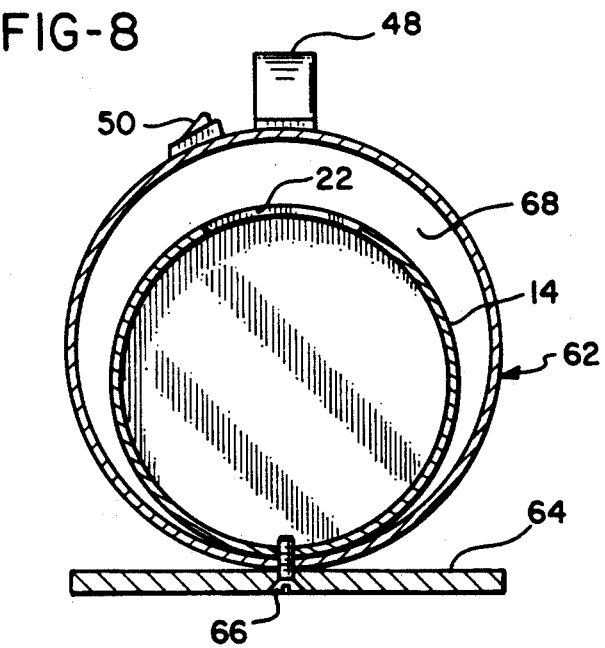
FIG. 8 is a sectional elevational view taken along the lines 8—8 of FIG. 7.

FIGS. 7 and 8 of the application illustrate a different embodiment of the invention. The tube speaker system 60 depicted therein is comprised of a pair of horizontally disposed speaker tubes 12 and 14 having the same construction as depicted and described in connection with the embodiment of FIGS. 1–4 with the exception that the connection terminals 50 and carrying handle 48 are not located directly on the speaker tubes 12 and 14. The speaker tube system 60 is further comprised of a relatively large diameter, horizontally disposed tunnel tube 62 within which the speaker tubes 12 and 14 reside. The speaker tubes 12 and 14 are in internally tangential contact with the larger diameter tunnel tube 62 along a line of contact therewith parallel to the axis of the speaker tubes 12 and 14, as best depicted in FIG. 8.

The supporting stand of the speaker tube 60 is comprised of a flat slab 64 which is disposed beneath the tunnel tube 62. The speaker tubes 12 and 14 are externally tangent relative to the tunnel tube 62 at the inner surface of the tunnel tube 62. The supporting stand 64 is externally tangent to the tunnel tube 62, and the stand 64, tunnel tube 62 and speaker tubes 12 and 14 are all secured together by wood screws 66 located at spaced intervals on the bottom of the speaker system 60. The speaker tubes 12 and 14 and the slab 64 are all tangent to the tunnel tube 62 at the lowermost portion of the tunnel tube 62 so that they can be secured together by a single series of screws 66.

The speaker tubes 12 and 14 are disposed in positions rotated 180 degrees about their axes from the positions depicted in FIGS. 1–4 so that the radial openings 22 therein face upwardly and are in communication with a cavity 68 having a crescent-shaped cross-sectional configuration as illustrated in FIG. 8. The cavity 68 serves as an audio tunnel having opposite open ends 70.

Since the tube speakers 12 and 14 are secured to the flat, slab-like stand 64, they will not roll on their sides when the speaker system 60 is placed within an automotive vehicle. The slab 64 serves as a stand atop which the tunnel tube 62 and the tube speakers 12 and 14 are mounted. Thus, the tube speaker system 60, like the other embodiments of the invention, has a stabilizing stand that prevents the speakers from rolling about within an automotive vehicle. Also, the tube speaker system 60 produces sound not only longitudinally directly along the axis of the speakers 24, but also through the open ends 70 of the audio tunnel cavity 68 formed between the interior surface of the tunnel tube 62 and the exterior surfaces of the cylindrical walls 16 of the tube speakers 12 and 14.

As in the other embodiments of the invention, sound emanates radially from within the enclosures of the tube speakers 12 and 14 out through the radial openings 22 therein and longitudinally along the length of the tube speaker system 60 and out both of the open ends 70 of the audio tunnel 68. The carrying strap handle 48 is located on the top surface of the tunnel tube 62, diametrically opposite the stand 64. The electrical terminals 50 for the speakers 24 are also located on the exterior surface of the tunnel tube 62 for access by the speaker wires leading from the amplifier.

As shown in the drawings, the various embodiments of the invention all provide a tube speaker system having improved stability of a tubular structure by providing the structure with a flat stand upon which tube speakers are secured so that they won't roll. Also, each of the embodiments of the tube speaker system of the invention includes a hollow audio tunnel which carries the sound from within the tube speaker alongside the tubular wall of the speaker housing and within a surrounding structure.

Undoubtedly, numerous variations and modifications of the invention will become readily apparent to those familiar with tube speaker systems. Accordingly, the scope of the invention should not be construed as limited to the specific embodiments illustrated and described herein, but rather is defined in the claims appended hereto.

I claim:

1. A tube speaker system comprising a pair of tubular cylinders, each having opposite blind and speaker ends and a cylindrical wall with a radially outwardly facing opening therethrough proximate said blind end thereof, said cylinders being disposed horizontally in mutually coaxial alignment with said blind ends of said cylinders in mutual abutment, a separate speaker mounted in each of said speaker ends of said cylinders, supporting means secured beneath said coaxially aligned cylinders to prevent said cylinders from rolling on their cylindrical walls, and a laterally enclosing structure open at both ends and extending the lengths of said coaxially aligned tubular cylinders to laterally enclose at least portions of said cylindrical walls thereof to thereby define a laterally enclosed sound tunnel between said laterally enclosing structure and said cylindrical walls, wherein said sound tunnel is in communication with said radially outwardly facing openings in said cylindrical walls of both of said tubular cylinders.

2. A tube speaker system according to claim 1 further comprising a cradle formed with upright, longitudinally extending sides that extend alongside of said cylindrical walls of said tubular cylinders on opposite sides thereof, and a horizontally disposed floor located beneath said tubular cylinders and extending between said upright sides, whereby said cradle serves as both the aforesaid supporting means and the aforesaid laterally enclosing structure.

3. A tube speaker system according to claim 2 wherein said cylindrical walls of said tubular cylinders are formed of cardboard, said sides of said cradle are formed of wood and said floor of said cradle is formed of pressboard.

4. A tube speaker system according to claim 1 wherein said laterally enclosing structure is cylindrical in shape and has a diameter larger than the diameter of said tubular cylinders and said tubular cylinders reside in internal tangential contact within said laterally enclosing structure and said supporting means is formed as a flat slab beneath said laterally enclosing structure in external tangential contact therewith.

5. In a tube speaker arrangement in which a pair of speaker tubes, each having a blind end and an opposite speaker end with a cylindrical wall extending therebetween, are mounted coaxially end to end in horizontal disposition with their blind ends in mutual juxtaposition and with their speakers ends mutually opposite each other with speakers mounted therein, the improvement comprising a supporting stand secured beneath said cylindrical tubes and forming a stable, underlying support for said speaker tubes, radially outwardly facing openings defined in each of said cylindrical walls of said speaker tubes proximate each of said blind ends thereof, and audio tunnel means open at both ends and having laterally enclosing walls that extend alongside said speaker tubes throughout their lengths, wherein said radially outwardly facing openings in said cylindrical walls of said speaker tubes are in open communication with said audio tunnel means.

6. A tube speaker arrangement according to claim 5 wherein said supporting stand is comprised of a pair of upright, longitudinally extending sides extending alongside said cylindrical walls of said speaker tubes, and a flat, horizontally disposed slab extending transversely between said sides with said speaker tubes located thereabove, whereby the interior surfaces of said sides and said slab and the exterior surfaces of said tubes serve as walls of said audio tunnel.

7. A tube speaker arrangement according to claim 6 wherein said speaker tubes are constructed of cardboard, said sides of said stand are constructed of wood, and said slab of said stand is constructed of pressboard.

8. A tube speaker arrangement according to claim 5 further comprising a horizontally disposed hollow lateral enclosure having a cylindrical shape and a diameter larger than that of said speaker tubes and said speaker tubes reside in internally tangential contact with said hollow lateral enclosure within said hollow lateral enclosure, and said stand is comprised of flat slab disposed beneath said hollow lateral enclosure and externally tangent relative thereto along a line of contact therewith.

9. A tube speaker arrangement according to claim 8 wherein said speaker tubes and said slab are all tangent to said hollow lateral enclosure at a lowermost portion of said hollow lateral enclosure.

10. A tube speaker system comprising a pair of horizontally disposed speaker tubes each having a cylindrical wall which terminates at opposite blind and speaker ends and wherein a radially outwardly facing opening is defined in each of said walls proximate said blind ends thereof, and said speaker tubes are disposed in end to end relationship with said blind ends thereof in mutual juxtaposition, and further comprising separate audio speakers mounted in each of said speaker ends of said speaker tubes, a stand secured to and supporting said speaker tubes from beneath and defining a flat, horizontal support for said speaker tubes, a lateral enclosure disposed about at least portions of said speaker tube walls in which said radially outwardly facing openings are defined, said lateral enclosure extending the lengths of said speaker tubes and having opposite end openings proximate at least said speaker ends of said cylindrical walls of said speaker tubes.

11. A tube speaker system according to claim 10 in which said stand is formed by a channel having a horizontal floor and upright sides and said speaker tubes extend the length of said channel and are secured atop the sides thereof, whereby said channel also forms said lateral enclosure.

12. A tube speaker system according to claim 10 in which said lateral enclosure is a hollow cylindrical tube having a diameter larger than that of said speaker tubes and said speaker tubes are secured within said hollow cylindrical tube and are internally tangent relative thereto, and said stand is formed by a flat, horizontal slab atop which said hollow cylindrical tube is mounted in externally tangential arrangement therewith.

* * * * *